United States Patent [19]

Katz

[11] Patent Number: 4,838,722

[45] Date of Patent: Jun. 13, 1989

[54] DEVICE FOR DISPENSING FLOWABLE SUBSTANCES

[75] Inventor: Otto Katz, Schwabach, Fed. Rep. of Germany

[73] Assignee: A.W. Faber-Castell Unternehmensverwaltung GmbH & Co., Stein, Fed. Rep. of Germany

[21] Appl. No.: 41,083

[22] PCT Filed: Jul. 10, 1986

[86] PCT No.: PCT/DE86/00284

§ 371 Date: Mar. 13, 1987

§ 102(e) Date: Mar. 13, 1987

[87] PCT Pub. No.: WO87/00404

PCT Pub. Date: Jan. 29, 1987

[30] Foreign Application Priority Data

Jul. 13, 1985 [EP] European Pat. Off. ....... 85 108 770.0
Jul. 13, 1985 [EP] European Pat. Off. ....... 85 108 771.8
Oct. 11, 1985 [DE] Fed. Rep. of Germany ...... 35 36332

[51] Int. Cl.[4] .................. B43K 24/08; B05C 17/00
[52] U.S. Cl. .................................. 401/101; 401/111; 401/151; 401/270; 401/279
[58] Field of Search ............... 401/99, 101, 102, 206, 401/268, 269, 270, 271, 273, 275, 278, 279, 176–179, 230, 232, 234, 84, 108, 141, 151, 274, 280, 103, 62, 65, 109, 111, 110, 115, 272; 222/391; 132/112

[56] References Cited

U.S. PATENT DOCUMENTS

| 12,309 | 1/1855 | Hartshorn et al. ................. 401/141 |
| 846,547 | 3/1907 | Brown ................................ 401/102 |
| 2,142,531 | 1/1939 | Stenersen . | |
| 2,293,211 | 8/1942 | Mureau . | |
| 2,382,314 | 8/1945 | Herb . | |
| 2,547,287 | 4/1951 | Sanders . | |
| 2,587,794 | 3/1952 | Le Roy et al. . | |
| 2,611,915 | 9/1952 | Prokop et al. . | |
| 2,932,046 | 4/1960 | Skolnikoff ....................... 401/269 X |
| 3,144,005 | 8/1964 | Johmann ............................ 401/103 |
| 3,144,676 | 8/1964 | LaMura ............................. 401/101 |
| 3,192,552 | 7/1965 | King ............................. 401/273 X |
| 3,215,320 | 11/1965 | Heisler et al. ..................... 222/391 |
| 3,268,939 | 8/1966 | Aversa ........................... 401/102 X |
| 3,351,074 | 11/1967 | Aston . | |
| 3,428,404 | 2/1969 | Ciancio . | |
| 3,690,778 | 9/1972 | Hirota ............................. 401/99 X |
| 4,043,681 | 8/1977 | Funahashi ......................... 401/151 |

FOREIGN PATENT DOCUMENTS

| 0028727 | 5/1981 | European Pat. Off. . |
| 28727 | 10/1981 | European Pat. Off. . |
| 0054212 | 6/1982 | European Pat. Off. . |
| 249042 | 9/1911 | Fed. Rep. of Germany . |
| 2334781 | 2/1975 | Fed. Rep. of Germany . |
| 2425062 | 12/1975 | Fed. Rep. of Germany . |
| A757858 | 1/1934 | France . |
| 1062365 | 4/1954 | France . |
| A24019 | of 1911 | United Kingdom . |
| A134705 | 11/1919 | United Kingdom . |

Primary Examiner—Richard J. Apley
Assistant Examiner—David J. Bender
Attorney, Agent, or Firm—Spencer & Frank

[57] ABSTRACT

A device for dispensing flowable substances which includes an elongated housing having a chamber between a front discharge opening and a rear end opening, a piston rod axially longitudinally displaceable in the housing, an applicator at a forward end of the piston rod so as to be projectable out of the housing through the front end and retractable into the chamber with forward and rearward displacement of the piston rod, a dosaging piston disposed in the chamber and opening and closing the front discharge opening with rearward and forward displacement of the piston rod, a sealing face on the piston rod displaceable into sealing engagement with the rear opening when the piston rod is displaced rearwardly, a coupling element supported on a rearward end of the piston rod, and a closing cap removably disposed on the front end of the housing so as to close the chamber, and being disposable on the coupling element.

19 Claims, 5 Drawing Sheets

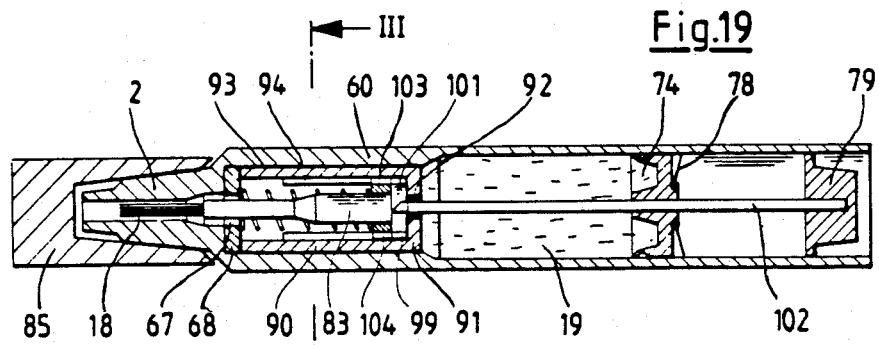
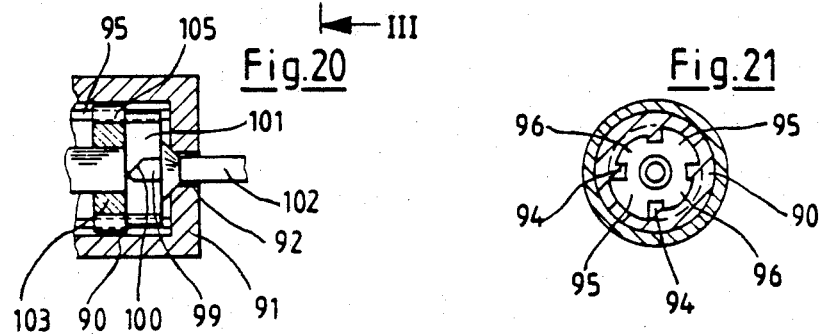
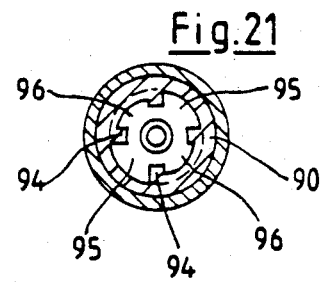
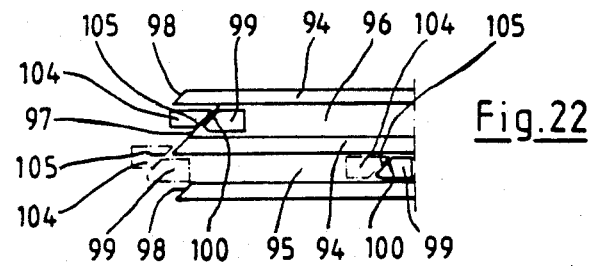
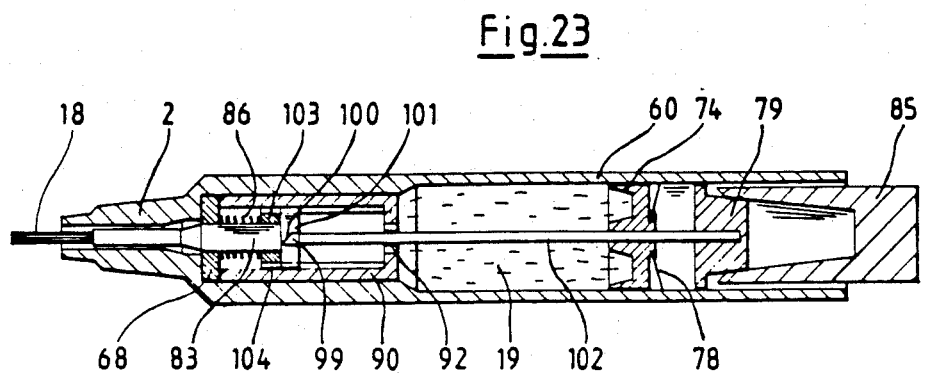

DEVICE FOR DISPENSING FLOWABLE SUBSTANCES

BACKGROUND OF THE INVENTION

The invention relates to a device for dispensing flowable substances from a pencil-shaped housing comprising a displaceably mounted control member with which a discharge opening for the substance can be closed and which includes an applicator disposed in a retracted position within a chamber of the housing which is closed by a removable cap and from which the applicator can be advanced. Flowable substances that can be used in this device are understood to be coloring liquids as they are used for make-up. This includes liquids for application onto the skin as well as those to be applied to the finger or toe nails. Depending on the intended use, these liquids may have widely varying viscosities. In addition, the device is also intended for use with other liquids, such as, for example, adhesives or solvents. The applicator is preferably a brush; however, fiber wicks or capillary tubes known from writing implements can also be employed.

A dispensing device for flowable substances, such as, for example, nail polish, is known (U.S. Pat. No. 4,063,829) in which an applicator in the form of a brush is advanced from a chamber disposed in the front section of the container. The brush is fastened in a slidable member provided with axial grooves through which a predetermined quantity of the flowable substance is supplied to the brush by the force of gravity. In the operating position of the brush, i.e. when it is oriented vertically downwardly, a ball valve blocks the further advance of liquid. For use of the dispensing device, before the cap is removed, the container must be held upright for a moment so as to fill the dosaging chamber. After removal of the protective cap, the dispensing device must be rotated in such a manner that the tip is directed downwardly. This causes the brush and the slide member to move within the chamber until the brush projects from the chamber and the slide member seals off the majority of the chamber, leaving narrow channels as the only connection between the brush and the interior of the dosaging chamber. Once the brush has been moistened with the liquid, it is ready for use. As soon as the measured quantity of liquid transferred to the brush has been used, the device must be tilted again to permit a new quantity of liquid to be supplied by way of the dosaging chamber.

Proper operation of this dispensing device is assured only if the ball valve as well as the slide member and the brush are able to move under the force of gravity.

Particularly for the use of nail polish it is necessary to permit such polish to dry shortly after it has been applied. For this reason, these polishes contain very volatile solvents which may, however, dry just as quickly within the dispenser.

In one device of the type described above, in which the movable parts are moved only by gravity and supported by acceleration forces generated by shaking the device, it may happen that the parts stick together and no longer move freely. Then the dispenser no longer functions properly. Designs of this type have therefore been unable to displace from the market the conventional nail polish bottles in which the brush is attached to the screw closure.

The already mentioned nail polish bottles employing brushes are known to have the drawback that during application with the brush the bottle is not closed. Thus, the liquid contained therein not only may easily dry up or thicken, there also exists the danger that the bottle may be tipped over and the liquid run out. To avoid this drawback, dispensing devices are known in which the applicator is not connected with the screw closure but is inserted directly into the container. According to West German Utility Model DE-GM No. 79/31,006, a container for nail polish is known which is equipped with an applicator brush at the mouth of the container. The bristles of the applicator brush are fastened to a movable head piece which is provided with channels and which can be retracted at least partially into the mouth of the container against the force of a spring element and in which the closing cap is provided with means for sealing the mouth of the container. If now the closing cap of this container is removed, the brush moves out of the head section of the container under the action of the spring. The container is now immediately exposed to the ambient air, possibly causing the liquid to dry out or thicken.

Summary of the Invention

It is the object of the invention to reduce, in a dispensing device for flowable substances, the influx of air into the interior of the container to a minimum and to arrange its manipulation so that it is impossible to inadvertently permit air to enter. It must not be possible that removal of the closing cap already permits liquid to flow out of the interior of the container unless the dispenser is being used for its intended purpose.

To accomplish this task, the invention configures a device for dispensing flowable substances of the above-mentioned type in such a manner that the applicator is disposed at one end of a piston rod which is axially longitudinally displaceable within the housing. The other end of the piston rod is provided with a coupling element to which the closing cap can be coupled once it has been removed from the front section. Providing a second seat for the closing cap prevents the dispenser from being inadvertently left open, thus permitting air to penetrate into the interior of the container. The user always needs the reseatable closing cap, so as to place it onto the coupling element and thus be able to use the device.

The reseatable closing cap may be of simple design. It may have a conical interior configuration adapted to the outer shape of the front section and of the coupling element. Thus there is only one mating surface on which the cap can be placed.

Improper operation of the dispenser can be avoided if the coupling element is made axially displaceable in a recess in the housing. Only if the cap is attached, which then projects from a recess, can the device be used.

In one embodiment, the device has such a configuration that a chamber is provided which has openings at opposite frontal faces, with displacement of the piston rod alternatingly opening and closing the opening oriented toward the supply tank by means of a sealing surface and the opening oriented toward the discharge bore by means of a dosaging piston, and the blocking piston is elastically deformable.

Thus, the supply tank employed in the device according to the invention is advantageously sealed against the external air in both end positions of the piston rod-even if the closing cap is removed. A further advantage is that the pressure exerted on the substance in order to cause discharge is absorbed without additional parts exclusively by the elastic configuration of the blocking piston. If the dosaging piston is moved into the chamber, the compression spring builds up this pressure which, although it drops when the dosaging piston leaves its bore, is sufficiently high to prevent external air from entering into the dosaging chamber. The supply tank itself is hermetically sealed again in the rear end position of the dosaging piston so that air is prevented from entering there as well.

As already mentioned, no air must enter into the chamber and into the supply tank when the piston rod and the dosaging piston with its sealing surface are between their two end positions. And liquid must be prevented from escaping when the dosaging piston remains between the two opposing openings. To prevent this it has been found to be advantageous for a shaft to follow the dosaging piston, with such shaft, between the two end positions of the piston rod, forming an annular capillary gap with the opening oriented toward the discharge bore.

Preferably, the volume of the chamber is smaller than the volume of the supply tank accommodating the flowable substance. In this way it is assured that the capillary forces in the annular gap behind the discharge bore are sufficiently high to prevent the substance from running out even if the device is in a vertical position.

To permit easy and machine assembly of the chamber in the supply tank, a two-part embodiment is provided in which the chamber is composed of a sleeve whose one front wall has an opening faced by a disc also having an opening. The smooth movement of the device can be influenced by stepping up the travel of the blocking piston in that the diameter of the dosaging piston is made significantly smaller than that of the blocking piston. The costs for individual parts can easily be reduced in that the dosaging piston not only produces pressure in the chamber and in the container but additionally acts as a valve. This can be realized by making the effective length of the dosaging piston shorter than the distance from the disc to the front wall of the chamber.

Operational reliability of the device depends essentially on the blocking piston performing several different functions. A good seal must be produced at the outer diameter and in the bore of the hub, which requires form stability. On the other hand, the piston must be able to absorb the volume of the substance displaced by the pressure, without escaping toward the rear end of the device. With the required stability of the piston this is assured due to the fact that the blocking piston is elastically deformable at least in the partial region which constitutes the piston base. The rigid configuration of the hub advantageously also serves to support the blocking element, for which purpose the blocking piston is provided with a thin blocking disk at an extension of the hub. The outer diameter of this blocking disk is greater than the diameter of the inner wall of the supply tank. The number of individual parts can be reduced in that the piston rod and the dosaging piston are made of one piece with the sealing surface and the latter is molded onto a valve ring which supports a compression spring. The differences in diameter between the dosaging piston and the blocking piston permit influencing the stroke of the dosaging piston. Due to the fact that, at the side of the dosaging piston oriented toward the discharge bore, a shaft is disposed which supports an applicator and this applicator, in its starting position, is completely retracted in the discharge bore under the influence of the compression spring, the applicator can be moved out of the discharge bore to the optimum extent for use. Distribution channels formed in a partial region of the discharge bore permit good wetting of the applicator.

A further advantage results from a coupling element fastened to the piston rod with which a closing cap can be coupled once it has been removed from the front section. In this way, it is assured that the user is able to use the device only if the closing cap has been placed onto the rear section of the container.

Increased ease of operation of the device results from the features wherein capillary channels are formed in a ring having a slope, and the application can be retracted into the discharge bore of the conical front section by means of the coupling element. Within the chamber and on the dosaging piston, guide, switching and detent elements are provided which permit the applicator to be locked in the advanced position against the force of a spring. Pressure on the closing cap unlocks and retracts the applicator, similar to a ball point pen switching mechanism. By configuring the chamber as a switching sleeve, a switching mechanism as basically disclosed in West German Auslegeschrift DE-AS No. 1,239,591 can be employed.

BRIEF DESCRIPTION OF THE DRAWINGS

The invention will be described in greater detail below with reference to the drawing. It is shown in:

FIG. 19, a longitudinal sectional view of the device in accordance with another embodiment of the invention;

FIG. 20, a partial sectional view of the switching mechanism of FIG. 19 to an enlarged scale;

FIG. 21, a cross-sectional view of the switching mechanism along line III—III of FIG. 19;

FIG. 22, a developed view of the operational section of the switching mechanism of FIG. 19; and FIG. 23, a longitudinal sectional view of the device of FIG. 19 with the closing cap on the rear end and the applicator advanced.

DETAILED DESCRIPTION OF THE PREFERRED EMBODIMENTS

Figure 1:
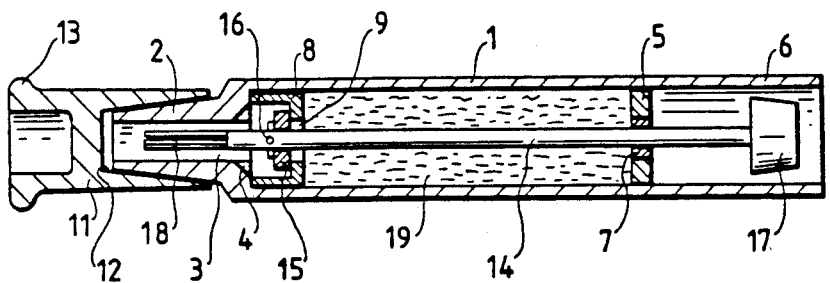
FIG. 1, a longitudinal sectional view of the device with the closing cap applied.
Figure 2:
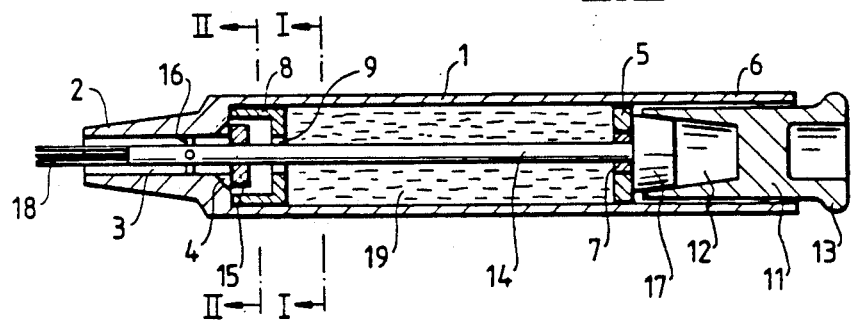
FIG. 2, a longitudinal sectional view with the closing cap placed on the other end.
Figure 3:
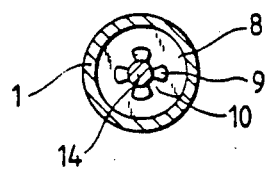
FIG. 3, a cross-sectional view along line I—I of FIG. 6.
Figure 4:
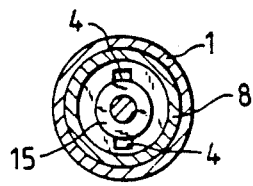
FIG. 4, a cross-sectional view along line II—II of FIG. 6.

The illustrated apparatus is composed of a housing 1, whose front section 2 is conically tapered and includes in this region a chamber 3 ending in channels 4 toward the interior of the container. A seal 7 is inserted into an end wall 5 forming a recess 6 therebehind. A cup-shaped insert 8 is provided with a plurality of discharge openings 9 and guide webs 10. This insert 8 is pressed into housing 1. A closing cap 11 comprising an internal frustoconical surface 12 and a bead 13 is placed onto front section 2. Centered in housing 1, a piston rod 14 is disposed so as to be axially longitudinally movable and a control piston 15 is seated on piston rod 14 so as to be displaced with friction. The longitudinal travel of piston rod 14 is rearwardly limited by cross pieces 16 which, if piston rod 14 is made of plastic, may be molded directly to it.

Additionally, a coupling element 17 is fastened to piston rod 14 in recess 6, with its outer face being adapted to the inner frustoconical surface 12 of closing cap 11. Piston rod 14 also includes an applicator 18, preferably a brush. A flowable substance 19 fills the interior of housing 1.

The device, which is shown in the rest position in FIG. 1, is hermetically sealed at its front end by closing cap 11. Influx of air from the other side is prevented by seal 7. To apply the flowable substance with the device, it is initially necessary to remove closing cap 11 from conical front section 2 and place it onto coupling element 17. This inevitably advances piston rod 14 toward the front until control piston 15 places itself against the mouths of channels 4. During further longitudinal movement of piston rod 14, applicator element 18 advances out of chamber 3. Since in the meantime control piston 15 has placed itself against channels 4, their cross section is reduced. If the device is held in a vertical position, substance 19 is now able to pass through discharge openings 9 and, due to the predetermined cross section of channels 4, is supplied to applicator 18 in such a manner that the quantity of substance 19 corresponds approximately to the quantity required for normal use.

When not in use, cap 11 is removed again from coupling element 17; this causes piston rod 14 to be moved toward the rear until control piston 15 again seals discharge openings 9. Applicator 18 returns to chamber 3 so that cap 11 can be placed onto front section 2 without damaging applicator 18.

Figure 5:
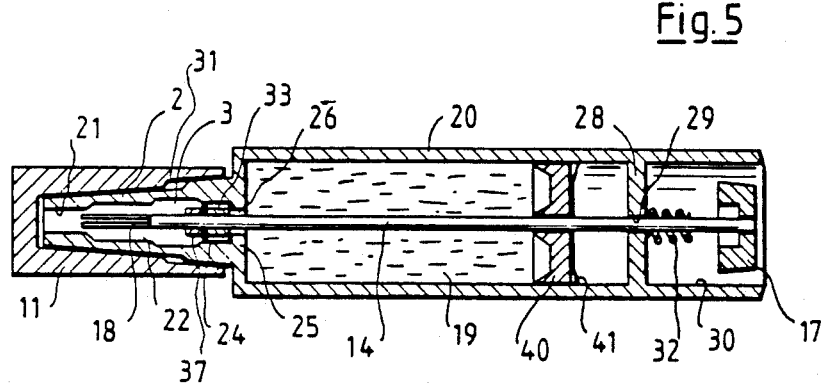
FIG. 5, a longitudinal sectional view of an improved embodiment with the cap attached.
Figure 6:
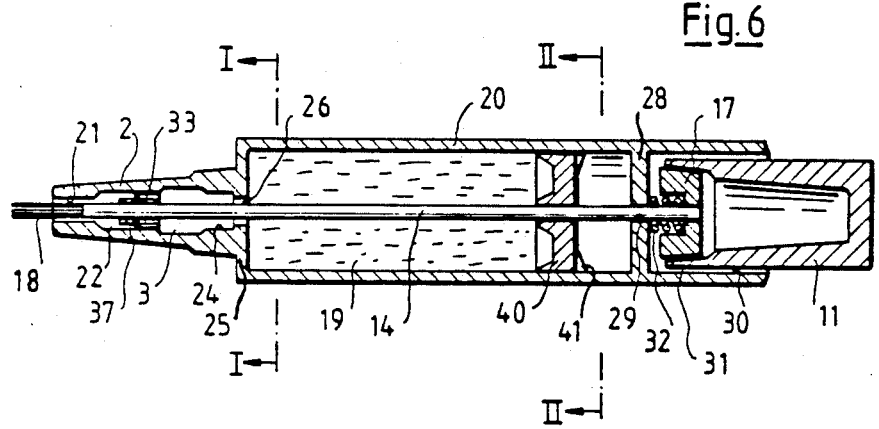
FIG. 6, a longitudinal sectional view of the same embodiment with the closing cap at the other end.
Figure 8:
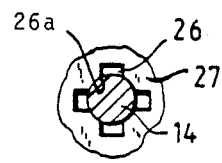
FIG. 8, a view along line I—I of FIG. 6.
Figure 9:
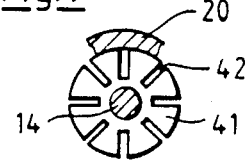
FIG. 9, a view along line II—II of FIG. 6.

The device shown in FIGS. 5 and 6 is composed of a container 20 whose front section 2 is conically tapered and includes, in this section, a discharge bore 21, a cylindrical space 22 and a widened chamber 3 changing to a bore 24. Bore 24 ends in a front wall 25. The connection to the interior of container 20 is formed by openings 26 between which guide webs 27 are disposed and surrounding a guide bore 26a for the piston rod 14 (See FIG. 8). The interior of container 20 is terminated at the rear by transverse wall 28 provided with a guide bore 29. Following transverse wall 28, a recess 30 is formed by an extension of container 20. To seal discharge bore 21 at the frustoconical front section 2, a cap 11 is provided which has at least one inner frustoconical surface 31.

Figure 7:
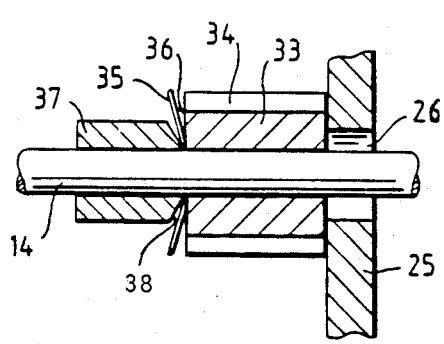
FIG. 7, a partial sectional view of the valve piston of FIG. 6.

Piston rod 14 is mounted in guide bore 29 so as to be axially movable. At one end, piston rod 14 is provided with a coupling element 17 which can be brought to rest against a compression spring 32. Referring also to FIG. 7, valve piston 33 having a plurality of molded-in axial grooves 34 is also disposed on the pistonrod. A diaphragm 35, supported by a rearwardly facing, rearwardly and radially inwardly sloping face ring 37 having a 38, lies against frontal face 36 of valve piston 33. At its front end, the piston rod is provided with an applicator 18 which may be a felt tip, a brush or a rounded section of piston rod 14. A blocking piston 40 is mounted on piston rod 14 so as to be axially displaceable and sealed. This blocking piston places itself against the inner wall of container 20 and has a blocking disk 41 fastened to it which is preferably made of steel and has a plurality of radial slits 42. See F Blocking disk 41 is supported at the inner wall of container 20; in the disassembled state, it is a disk which has a diameter larger than the inner diameter of container 20.

Figure 10:
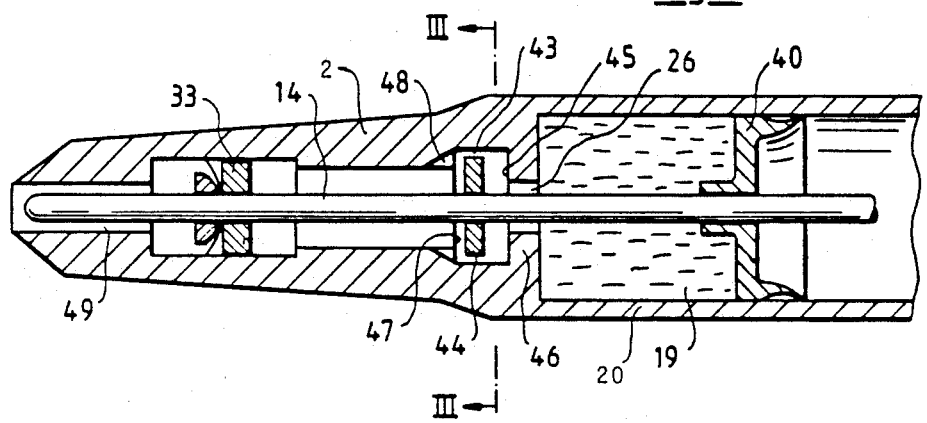
FIG. 10, a longitudinal sectional view of a further embodiment employing an additional control disk.
Figure 11:
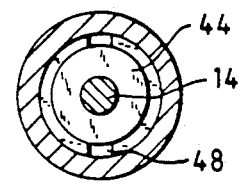
FIG. 11, a view along line III—III of FIG. 10.

FIGS. 10 and 11 show a further embodiment in which blocking piston 40 does not include a blocking disk 41. This blocking piston 40 rests against the interior wall of the container with greater friction than against piston rod 14, thus permitting piston rod 14 to move without displacing blocking piston 40. In the region of frustoconical front section 2, an annular chamber 43 is formed in container 20 to accommodate a control disk 44 which is movable with a friction fit on piston rod 14. This control disk 44 can thus be placed against a planar rear face 45 formed at wall 46. When piston rod 14 is displaced, control disk 44 can also be brought to lie against a planar frontal face 47 into which open overflow channels 48. (See FIG. 11) In this embodiment, the applicator is a discharge channel 49 through which substance 19 flows out.

Figure 12:
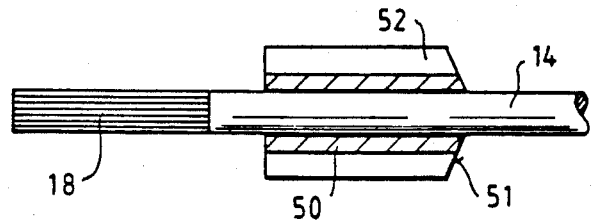
FIG. 12, a sectional view of the ring on the piston rod.

FIG. 12 shows a detail of ring 50 which, as in the embodiment of FIGS. 5-9 has a sloping rear face 51. To better distribute the flowable substance 19 pressed out by valve piston 33, capillary channels 52 are provided which have a reduced cross section so as to form a capillary gradient in the direction toward applicator 18.

Mode of Operation

The front of container 20 filled with flowable substance 19 is sealed, according to FIG. 5, with a cap 11. To operate the device, cap 11 must initially be removed and placed onto coupling element 17. This moves piston rod 14 toward the front and together with it, valve piston 33 which thus exposes openings 26. Now, substance 19 is already able to exit from the interior of the container since a slight suction force is produced by valve piston 33. This suction force, however, is interrupted as soon as valve piston 33 reaches chamber 3 which has a larger diameter than diaphragm 35. Due to the length of chamber 3, it is thus possible to advance the piston rod and push applicator 18 out of discharge bore 21. If, during the further advance of piston rod 14, valve piston 33 enters into cylinder 22, diaphragm 35 places itself against the frontal face of valve piston 33 blocking grooves 34 and produces a seal with the result that a subatmospheric pressure is generated which causes further flowable substance 19 to be sucked out of the interior of the container. During movement of valve piston 33 within cylinder 22, coupling element 17 abuts on compression spring 32. At the end of the movement of coupling element 17 which is charged by cap 11 being placed on it, compression spring 32 pulls piston rod 14 back again as soon as there no longer is any pressure on coupling element 17. During the return movement of piston rod 14, valve piston 33 presses against flowable substance 19 which has now filled chamber 3. Substance 19 thus penetrates into axial grooves 34, tilts diaphragm 35 forward and finally flows in the direction toward applicator 18 or into discharge channel 49. The quantity to be discharged is given by the path of spring 32 during its compression, while the dosaging process and the discharge of substance 19 takes place under the influence of the decompressing spring 32.

Thus, during each dosaging process, piston rod 14 is initially displaced forward and then moved back again under the action of compression spring 32. The discharged quantity of flowable substance 19 is thus determined by the path of blocking piston 40 which follows substance 19, supported by the suction effect, the adhesion forces and ultimately by gravity. To prevent return of blocking piston 40, the blocking disk 41 is provided whose function, however, can also be performed by the control disc 44 shown in FIG. 10. During the return travel of piston rod 14, control disk 44 places itself against a planar face 45 and thus closes openings 26. In the reverse direction, during advance of piston rod 14 and during sucking in of flowable substance 19 by means of valve piston 33 and its diaphragm 35, control disk 44 places itself against planar frontal face 47 with overflow channels 48 permitting passage of substance 19.

With the aid of the above-described device, it is thus possible to transfer measured quantities of flowable substances 19 having different viscosities to an applicator 18 or to press them out of a discharge channel 49.

Applicator 18, which can be retracted into cylindrical space 22 of frustoconical front section 2, is there not only protected in its rest position; it is also prevented from being damaged when cap 11 is applied, which is of particular significance if a brush having soft bristles is used as applicator 18. Moreover, placing applicator 18 in cylindrical space 22 and chamber 3 has the result that, in its retracted state, it is almost completely surrounded by substance 19 thus substantially preventing the brush bristles from drying out. When applicator 18 is advanced, it is thus already saturated with flowable substance 19 and ready for use. The only drying out occurs at the end of discharge bore 21 and applicator 18 is able to penetrate such dried portions without being damaged since applicator 18 fits very tightly in discharge bore 21.

Figure 13:
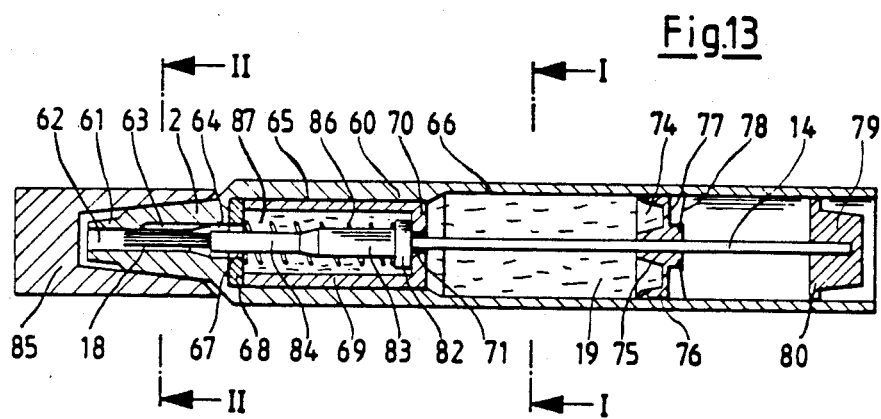
FIG. 13, a longitudinal sectional view of the device with the applicator retracted.
Figures 14, 15, 16:
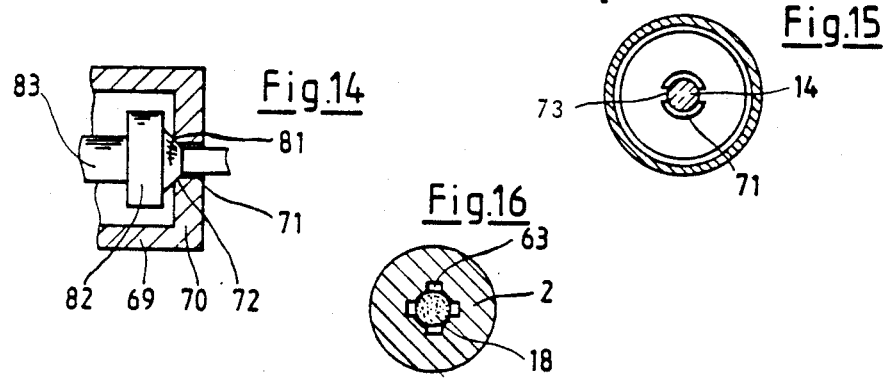
FIG. 14, an enlarged view of a region of FIG. 13.
FIG. 15, a sectional view along line I—I of FIG. 13.
FIG. 16, a sectional view along line II—II of FIG. 13.

FIG. 13, which is a longitudinal sectional view of another embodiment, and the enlarged sectional view of FIG. 15 show all parts of the device in their starting positions. A cylindrical supply vessel 60 changes into a frustoconical front section 2 and ends in a step 61. A discharge bore 62 in the region of front section 2 has a plurality of distribution channels 63 which open into a dosaging bore 64 followed by a bearing bore 65 which tapers toward inner wall 66 of storage vessel 60. A front opening 67 is provided in a disk 68 which is held in a sleeve 69 inserted into bearing bore 65. At an inner frontal face of sleeve 69, there is provided a front wall 70 having a further opening 71 which becomes frustoconical at 72 toward the interior of sleeve 69 and is provided with additional guide webs 73. A blocking piston 74 composed of a hub 75 and a sealing ring 76 connected with one another by means of a piston base 77 lies in the supply vessel with sealing ring 76 against inner wall 66. A blocking disk 78 preferably made of metal and having a diameter, in the planar position, which is larger than the inner diameter of supply vessel 60 measured at inner wall 66, is fastened to hub 75.

A piston rod 14 provided at its rear end with a coupling element 79 and a guide plate 80 is pushed through hub 75 of blocking piston 74. Within sleeve 69 on piston rod 14 a frustoconical sealing face 81 is shaped to a valve ring 82, with this valve ring 82 being followed by a dosaging piston 83 which changes into a shaft 84 in which an applicator 18 is fastened. Conventional felt tips are suitable as applicator 18 as they are known from writing implements; preferred, however, is a brush as it is customary in the screw caps of nail polish bottles. A cap 85 serves to close discharge bore 62 and can be clamped to frustoconical front section 2, with step 61 retaining any flowable substance 19 possibly escaping from discharge bore 62. Valve ring 82 and disk 68 serve as abutments for a compression spring 86, thus continuously pressing piston rod 14 into the starting position shown in FIG. 13. The apparatus thus includes two separate interior chambers, one of which, chamber 87, acts as the so-called dosaging chamber, while supply vessel 60 holds available a supply of flowable substance 19.

Figure 17:
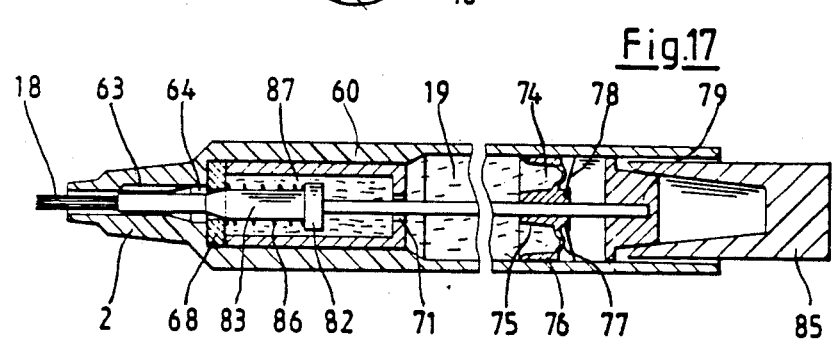
FIG. 17, a longitudinal sectional view of the device of FIG. 13.
Figure 18:
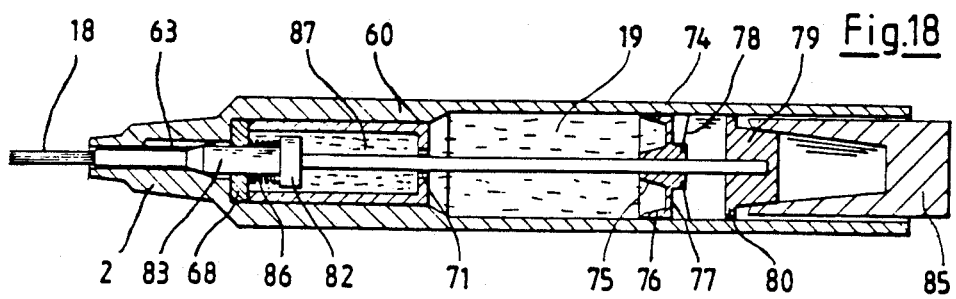
FIG. 18, a longitudinal sectional view of the device of FIG. 13 with the dosage piston in its forward position.

The be able to transport flowable substance 19 from supply vessel 60 to applicator 18, cap 85 is initially removed and placed onto coupling element 79. Now it is possible to move piston rod 14 forward into discharge bore 62 against the force of compression spring 86. It must be assumed that flowable substance 19 completely fills supply vessel 60 as well as chamber 87 and is additionally already contained in at least part of distribution channels 63. Once sealing face 81 has been lifted away from frustoconical opening 72, the movement of piston rod 14 initially exposes rear opening 71. During further movement of piston rod 14 in the same direction, dosaging piston 83 moves in chamber 87 until it enters into front opening 67. As soon as this has taken place, further movement of dosaging piston 83 produces a subatmospheric pressure in chamber 87 as well as in supply vessel 60 with the result that blocking piston 74 continues to lie against flowable substance 19 and thus moves in the direction toward discharge bore 62. If now, dosaging piston 83 has reached its forward position shown in FIG. 18, applicator 18 is in the operating position and can be used to apply flowable substance 19, to the extent that it is contained thereon. Once this substance 19 has been applied, applicator 18 must be retracted again which compression spring 86 is able to do if no pressure is exerted on coupling element 79. If now dosaging piston 83 enters into chamber 87, pressure is generated there pressing substance 19 against blocking piston 74. Since blocking piston 74 itself cannot move backward along inner wall 66, but is supported by blocking disk 78, the pressure is absorbed by the elastic deformation of piston base 77 as shown in FIG. 17. The pressure increases as long as dosaging piston 83 moves into chamber 87. When, however, dosaging piston 83 leaves opening 67 in disk 68, the pressure is able to be reduced through opening 67. This is accomplished by the elasticity of piston base 77 which again takes on its position shown in FIG. 13. During reshaping of piston base 77, a predetermined quantity of substance 19 is pressed out of opening 67 into dosaging bore 64 and into distribution channels 63. The retracted applicator 18 is now also disposed in the region of distribution channels 63 and is there resupplied with flowable substance 19. If applicator 18 is then pushed out of discharge bore 62, substance 19 can again be applied.

The device according to the embodiment of FIGS. 19 to 23 has an elongated member which is longitudinally movable in the device housing and includes a piston rod, a valve ring, a dosaging piston and a shaft, and; operates according to the same principle as the embodiment according to FIGS. 13 to 18, but with the difference that applicator 18 can be fixed in the operating position against the force of compression spring 86. For this purpose, a switching sleeve 90 is inserted into supply vessel 60 and is provided with an opening 92 in its frontal face 91 and with a plurality of ribs 94 on its inner wall 93. A switching groove 95 and a stop groove 96 are alternatingly formed between ribs 94, with stop groove 96 being less deep than switching groove 95 and ending in a sloped supporting face 97. Ribs 94 end at sloped abutments 98 and have the same slope angle as supporting faces 97. Switching cams 99 having a lateral slope 100 are provided on valve ring 101 which is made of one piece with a piston rod 102. Dosaging piston 83 attached to the front end of valve ring 101, which is identical with the embodiment of FIG. 13, further supports a rotatably mounted switching cross 103 (FIG. 20) provided with a plurality of switching cams 104 having slopes 105. The number of switching cams 104 on switching cross 103 is only half the number of switching cams 99 on valve ring 101.

When cap 85 is placed onto coupling element 79, piston rod 102 can be axially displaced to bring flowable substance 19 to applicator 18 and put it into the operating position. Switching cams 99 disposed on valve ring 101 are thus guided in switching grooves 95 and stop grooves 96, while switching cams 104 at switching cross 103 lie exclusively in switching grooves 95 and are there moved axially. If now switching cams 104 (FIG. 22) leave switching grooves 95, switching cross 103 turns, with corresponding slopes 100, 105 sliding on one another. After leaving slope 100, slope 105 is initially pressed by the force of compression spring 86 against sloped abutment 98 and then slides onto supporting face 97 at the end of stop groove 96. Thus, switching cross 103—which has turned —is detained at this point and supports compression spring 86. Thus applicator 18 can no longer be set back into discharge bore 62 by the force of compression spring 86, as is the case in the embodiment according to FIG. 13.

To set applicator 18 back, piston rod 102 must be pushed through until switching cams 104 of switching cross 103 lift away from supporting face 97 and slide over the adjacent rib 94. Due to the sloped abutment 98, switching cams 104 are moved into switching grooves 95. Compression spring 86 is now able to return dosaging piston 83 to its starting position and thus close opening 92.

What is clamed is:

1. A device for dispensing flowable substances, comprising:
   an elongated housing having a front end, a rear end, a chamber and a supply vessel rearward of said chamber, said front end having a discharge bore forward of said chamber and a front end opening forward of said discharge bore, said chamber having a front face and a rear face at respective opposite longitudinal ends thereof, said front and rear faces respectively having front and rear openings therein, said chamber respectively communicating with said discharge bore and said supply vessel through said front opening and said rear opening;
   an elongated member having a forward end and a rearward end and axially longitudinally displaceable in said housing, said elongated member having in said chamber a sealing face facing said rear face, which alternately closes and opens said rear opening with rearward and forward displacement of said elongated member, and a dosaging piston facing said front face, which alternately opens and closes said front opening with rearward and forward displacement of said elongated member;
   a cylindrical switching sleeve in said housing forming said chamber therein, said sleeve having axially longitudinally extending circumferentially spaced ribs along a part thereof and stop grooves and switching grooves alternately disposed between said ribs;
   a valve ring fixed to said elongated member in said sleeve having first switching cams longitudinally axially displaceable in said switch grooves and said stop grooves;
   a switching cross confronting said valve ring and surrounding said elongated member in said sleeve, having second switching cams axially longitudinally displaceable in said switch grooves, said cross being displaceable axially beyond switching grooves in said sleeve, said cross being rotatable in said sleeve when beyond said switching grooves, the number of said first switching cams being twice the number of said second switching cams; and
   an elastically deformable blocking piston on said elongated member at a rear end of said supply vessel opposite said rear opening of said chamber.

2. A device as in claim 5, further comprising a compression spring, said elongated member, said dosaging piston and said sealing face having a one piece construction, said elongated member further including a valve ring having said sealing face molded thereon, said compression spring being disposed on said elongated member and supported at one end on said compression spring by said valve ring.

3. A device as in claim 2, wherein said compression spring is supported at another end of said compression spring opposite said one end by said front face of said chamber.

4. A device as in claim 1, wherein said switching grooves and said stop grooves have different respective radial depths, said stop grooves terminating in sloped supporting faces.

5. A device for dispensing a flowable substance, comprising:
   a. a longitudinally elongated housing having a front end and a rear end, said housing including
      (1) a dosaging chamber,
      (2) a supply vessel for storing a quantity of the flowable substance, rearward of said chamber,
      (3) a discharge bore in said front end, forward of said chamber, and
      (4) a front end opening, opening to the exterior of the housing forward of said discharge bore; said chamber having a front face and a rear face at respective opposite longitudinal ends thereof, said front and rear faces respectively having front and rear openings therein, said chamber respectively communicating with said discharge bore and said supply vessel through said front opening and said rear opening;

b. a longitudinally elongated member having a forward end and a rearward end and being axially longitudinally displaceable in said housing, said elongated member having
  (1) a sealing face disposed in said chamber and facing said rear face, said sealing face alternately closing and opening said rear opening with rearward and forward displacement of said elongated member,
  (2) a dosaging piston disposed in said chamber and opening and closing said front opening with rearward and forward displacement of said elongated member, and
  (3) a shaft on a forward end of said dosaging piston so as to project into said discharge bore through said front opening, said shaft having a lesser diameter than a diameter of said front opening;
c. an applicator mounted to said a forward end of said shaft so as to be displaceable with rearward and forward displacement of said elongated member outward of said front end opening and into said discharge bore; and
d. an elastically deformable blocking piston on said elongated member at a rear end of said supply vessel opposite said rear opening of said chamber sealing said supply vessel against the rearward escape of the substance therefrom, said elongated member being longitudinally movable with respect thereto, such that a longitudinal movement of said elongated member with said shaft in said front opening causes a predetermined amount of the substance to pass through said front opening into said discharge bore to be retained by said applicator.

6. A device as in claim 5, further comprising:
a coupling element supported on said rearward end of said elongated member; and
a closing cap removably disposed on said front end of said housing so as to close said front end opening and disposable on said coupling element.

7. A device as in claim 5, wherein said shaft and said front opening define therebetween an annular capillary gap when said elongated member is between opposite end positions respectively in which said sealing face closes said rear opening and said dosaging piston closes said front opening.

8. A device as in claim 5, wherein said chamber has a volume smaller than the volume of said supply vessel.

9. A device as in claim 5, further comprising:
a sleeve in said housing having said chamber therein, said sleeve having a frontal wall having said front opening therein, and
a disk facing said sleeve, having said rear opening therein.

10. A device as in claim 9, wherein the distance between said dosaging piston and said sealing face is less than the distance between said disk and said frontal wall.

11. A device as in claim 5, wherein said dosaging piston has a diameter substantially smaller than the diameter of said blocking piston.

12. A device as in claim 5, wherein the distance between said dosaging piston and said sealing face is less than the distance between said front opening and said rear opening.

13. A device as in claim 5, wherein said blocking piston has an inner portion engaging said piston rod, an outer portion engaging said housing and an elastically deformable surface portion between said inner and outer portions which deforms so as to push the predetermined amount of the substance into said discharge bore when said elongated member is moved from the end position in which said dosaging piston closes said front opening to the end position in which the sealing face closes said rear opening.

14. A device as in claim 5, further comprising a blocking disk having a diameter greater than an inner diameter of said supply vessel, said blocking piston being disposed between said blocking disk and said supply vessel and has a hub through which said elongated member extends, said blocking disk being fastened to said hub.

15. A device as in claim 5, wherein said blocking piston has a hub engaging said elongated member, an outer portion engaging an inner wall of said supply vessel and an elastically deformable surface portion between said inner and outer portions, said hub having an extended portion behind said surface portion, said blocking piston having a blocking disk at said extended portion of said hub, said blocking disk being spaced from said elastically deformable surface portion and having a diameter greater than an inner diameter of said supply vessel.

16. A device as in claim 5, further comprising a compression spring in said housing, said compression spring urging said elongated member in a rearward direction toward a starting position in which said applicator is completely within said discharge bore, said applicator being projectable against the force of said compression spring out of said discharge bore through said front end opening with forward displacement of said elongated member.

17. A device as in claim 5, wherein said discharge bore has distribution channels in a partial region thereof, said shaft having a radially peripheral surface and being projectable into said partial region of said discharge bore so as to have said distribution channels at said radially peripheral surface.

18. A device as in claim 5, further comprising a blocking disk having a diameter greater than an inner diameter of said supply vessel, wherein said blocking piston is disposed between said blocking disk and said supply vessel and has an inner hub portion engaging said elongated member and fixed to said blocking disk, an outer portion engaging said housing and an elastically deformable surface portion between said hub and said outer portion which deforms so as to push the predetermined amount of the substance into said discharge bore when said elongated member is moved from the end position in which said dosaging piston closes said front opening to the end position in which the sealing face closes said rear opening.

19. A device as in claim 5, wherein said dosaging piston has a cylindrical outer surface of predetermined longitudinal extent and is partially extendable into said discharge bore while closing said front opening with longitudinl movement of said elongated member.

* * * * *